(12) United States Patent
Ho

(10) Patent No.: US 11,479,028 B2
(45) Date of Patent: Oct. 25, 2022

(54) WATERPROOF CORRUGATED PAPER, MANUFACTURING METHOD THEREOF, MANUFACTURING APPARATUS THEREOF, AND USAGE THEREOF

(71) Applicant: TAIWAN LUNG MENG ADVANCED COMPOSITE MATERIALS CO., LTD., Tainan (TW)

(72) Inventor: Ding-Shyan Ho, Tainan (TW)

(73) Assignee: TAIWAN LUNG MENG ADVANCED COMPOSITE MATERIALS CO., LTD., Tainan (TW)

(*) Notice: Subject to any disclaimer, the term of this patent is extended or adjusted under 35 U.S.C. 154(b) by 0 days.

(21) Appl. No.: 17/138,584

(22) Filed: Dec. 30, 2020

(65) Prior Publication Data
US 2021/0300008 A1 Sep. 30, 2021

(30) Foreign Application Priority Data

Mar. 30, 2020 (TW) .................. 109110807

(51) Int. Cl.
*B05C 1/08* (2006.01)
*B05D 1/28* (2006.01)
(Continued)

(52) U.S. Cl.
CPC ............ *B32B 29/08* (2013.01); *B05C 1/0834* (2013.01); *B05D 1/28* (2013.01); *B31F 1/2809* (2013.01);
(Continued)

(58) Field of Classification Search
CPC ........ B31F 1/28; B31F 1/2804; B31F 1/2809; B31F 1/2813; B31F 1/2818; B31F 1/2854;
(Continued)

(56) References Cited

U.S. PATENT DOCUMENTS 3,518,142 A * 6/1970 Dooley .................. D21H 27/40
156/205
3,691,120 A * 9/1972 Susuki .................. C09J 123/08
524/272
(Continued)

FOREIGN PATENT DOCUMENTS

CN 102173162 A 9/2011
CN 202030986 U 11/2011
(Continued)

OTHER PUBLICATIONS

Search report for TW109110807, dated Jan. 8, 2021, Total of 1 page.
(Continued)

*Primary Examiner* — Michael A Tolin
(74) *Attorney, Agent, or Firm* — Apex Juris, PLLC; Hilde Coeckx

(57) ABSTRACT

A waterproof corrugated paper includes at least one stone paper medium and at least one stone liner paper, wherein the at least one stone paper medium includes a first fluting surface. A stone glue is utilized to adhere the at least one stone liner paper and several wave crests of the first fluting surface. The stone glue includes a linear polyolefin plastic material and an inorganic material. The linear polyolefin plastic material is 30 wt %-70 wt % based on the stone glue, and the inorganic material is 30 wt %-70 wt % based on the stone glue. The waterproof corrugated paper provided by the present invention is waterproof and frost-resistant, which is adapted to package cooled or frozen food. A manufacturing method, a manufacturing apparatus, and a usage of the waterproof corrugated paper are also provided in the present invention.

7 Claims, 6 Drawing Sheets

(51) Int. Cl.
*B31F 1/28* (2006.01)
*B32B 29/08* (2006.01)
*B32B 37/12* (2006.01)
*B32B 37/20* (2006.01)
*B32B 7/12* (2006.01)
*C09J 123/06* (2006.01)
*C09J 123/12* (2006.01)
*C09J 11/04* (2006.01)
*B32B 29/00* (2006.01)
*B32B 9/00* (2006.01)
*B32B 37/00* (2006.01)
*B32B 37/16* (2006.01)

(52) U.S. Cl.
CPC .............. *B31F 1/2818* (2013.01); *B32B 7/12* (2013.01); *B32B 9/002* (2013.01); *B32B 29/005* (2013.01); *B32B 37/0053* (2013.01); *B32B 37/0076* (2013.01); *B32B 37/1284* (2013.01); *B32B 37/16* (2013.01); *B32B 37/20* (2013.01); *C09J 11/04* (2013.01); *C09J 123/06* (2013.01); *C09J 123/12* (2013.01); *B32B 2307/7265* (2013.01); *B32B 2307/732* (2013.01); *B32B 2309/08* (2013.01); *B32B 2309/14* (2013.01); *B32B 2318/04* (2013.01)

(58) Field of Classification Search
CPC .. B32B 3/28; B32B 7/12; B32B 9/002; B32B 29/005; B32B 29/08; B32B 37/0053; B32B 37/0076; B32B 37/1284; B32B 37/1292; B32B 37/16; B32B 37/20; B32B 2307/7265; B32B 2307/732; B32B 2309/08; B32B 2309/14; B32B 2318/04; C09J 11/04; C09J 123/04; C09J 123/06; C09J 123/10; C09J 123/12; B05C 1/0834; B05C 1/0865; B05D 1/28; B29C 65/526
See application file for complete search history.

(56) References Cited

U.S. PATENT DOCUMENTS

| | | | | |
|---|---|---|---|---|
| 3,775,521 A | * | 11/1973 | Yamamoto | C08L 23/0876 264/45.3 |
| 4,086,116 A | * | 4/1978 | Yazaki | B31F 1/2804 156/205 |
| 4,132,581 A | * | 1/1979 | Swartz | B29C 65/18 156/208 |
| 4,190,565 A | * | 2/1980 | Cook | C09J 151/06 524/77 |
| 4,886,563 A | * | 12/1989 | Bennett | B32B 7/12 156/205 |
| 5,449,431 A | * | 9/1995 | Isowa | B31F 1/2877 156/205 |
| 2002/0130064 A1 | * | 9/2002 | Adams | B01D 29/07 210/488 |

FOREIGN PATENT DOCUMENTS

| | | |
|---|---|---|
| CN | 102821936 A | 12/2012 |
| CN | 103273715 A | 9/2013 |
| JP | S5416787 Y1 | 6/1979 |
| JP | S5851138 A | 3/1983 |
| TW | 200517256 A | 6/2005 |

OTHER PUBLICATIONS

English abstract for CN102173162, Total of 1 page.
English abstract for CN102821936, Total of 1 page.
English abstract for CN103273715, Total of 1 page.
English abstract for CN202030986, Total of 1 page.
English abstract for TW200517256, Total of 1 page.
Japanese Office Action for JP2021-037241, dated Feb. 1, 2022, Total of 4 pages.

* cited by examiner

WATERPROOF CORRUGATED PAPER, MANUFACTURING METHOD THEREOF, MANUFACTURING APPARATUS THEREOF, AND USAGE THEREOF

BACKGROUND OF THE INVENTION

Technical Field

The present invention relates generally to a corrugated paper, and more particularly to a waterproof, frost-resistant, and naturally decomposable corrugated paper, also a manufacturing method, a manufacturing apparatus, and a usage thereof.

Description of Related Art

A conventional corrugated paper for packaging, especially a corrugated carton, wherein paper materials are usually made from wood pulp, and the wood pulp is made from wood fiber. Although a part of paper manufacturer makes efforts to obtain FSC certification (issued by Forest Stewardship Council), most of environmental organizations still suggest reducing the usage of wood pulp paper sheets in order to prevent deforestation, because trees grow very slowly.

Since the conventional corrugated carton made from wood pulp papers has enough strength and is convenient for being transported, the conventional corrugated carton has been applied in various fields to package and to protect products. However, when the conventional corrugated carton is used for packaging products which are refrigerated or frozen, droplets are condensed on a surface of the conventional corrugated carton due to a raising temperature after the corrugated carton is taken out of a refrigerator. If the droplets condensed on the surface of the corrugated carton aren't wiped out immediately, the droplets will be infiltrated into the conventional corrugated carton to make the conventional corrugated carton wet and weak. The wet corrugated carton is not only hard to be transported but also easily damaged, and the products stored in the corrugated carton will be damaged as well.

In addition, corrugated papers made of wood pulp papers can't tolerant a low temperature lower than or equal to minus 40 degrees Celsius. The pulp papers are easy to absorb moisture, so that when the corrugated carton made of the wood pulp papers is stored in the refrigerator, a fiber structure of the corrugated carton made of the wood pulp papers is easily broken when the absorbed moisture freezes and expands. Therefore, the corrugated carton stored in a refrigerator for a long time will be gradually damaged and broken, becoming unable to be used. On the other hand, after the corrugated carton is repeatedly frozen and unfrozen, the corrugated carton made of the wood pulp papers becomes not only wet, soft, weak, and hard to be transported, but also easily allowing mold and bacteria growth, resulting in increase of a safety risk of food packaging. Although a part of the corrugated carton made of the wood pulp papers is added with an antibacterial and antifungal agent to prevent the mold and bacteria growth, a part of the antibacterial and antifungal agent may be dissolved into the packaged food, increasing the safety risk of the packaged food. Additionally, conventional papers are made from wood pulp. A large amount of agents, such as strong acids, strong alkalis, and bleach, needs to be used to turn the wood into the wood pulp, and these agents are harmful for the environment. Besides, a large amount of water is consumed for treating the wood pulp, and that wastes a lot of water resources. More specifically, the water consumption for manufacturing wood pulp is 90 tons of water for producing per 1 ton of wood pulp, and then to turn the wood pulp into per 1 ton of the conventional papers needs to consume extra 35 tons of water.

A corrugated box made of plastic hollow boards is existed on the market to replace the conventional corrugated carton made of the wood pulp papers, wherein a production speed of the corrugated box made of the plastic hollow boards is 15 M/min, and a raw material contains a high percentage of plastic and a low percentage of inorganic powder, which goes against a policy of limiting or reducing plastic promoted by countries around the world. Besides, the plastic hollow boards cannot prevent the bacterial from growing.

In conclusion, to manufacture the conventional corrugated box needs to fell trees, causing damage to the forest environment. Besides, the corrugated box made of wood pulp paper has worse durability under a cooling or freezing environment. If manufacture the corrugated box by the plastic hollow boards, the more production lines are needed to promote a yield, and a large amount of plastic is needed to be consumed for producing. Therefore, a new corrugated box is needed to overcome the problems existed in the conventional corrugated box made of the wood pulp paper or the plastic hollow boards.

BRIEF SUMMARY OF THE INVENTION

In view of the above, the primary objective of the present invention is to provide a waterproof corrugated paper, and a thickness of the waterproof corrugated paper is between 0.6 mm and 6.0 mm, wherein a main ingredient of the waterproof corrugated paper include an inorganic stone powder which is made by grinding a natural stone, and a little of linear polyolefin plastic material is added for binding. Therefore, a manufacturing method of the waterproof corrugated paper provided by the present invention could completely avoid using wood pulp, so that it could avoid using a strong acid, a strong alkalis, and bleach and decrease the consumption of water resources. More specifically, to produce a ton of waterproof corrugated paper by using the manufacturing method of the waterproof corrugated paper provided by the present invention only consumes 0.9 ton of water for cooling down. The water consumption of producing the waterproof corrugated paper is 1% of the water consumption of producing a conventional pulp paper. Besides, comparing with a conventional corrugated paper made of wood pulp papers, the waterproof corrugated paper provided by the present invention has significant waterproof and frost resistant ability. Even though the waterproof corrugated paper is frozen and unfrozen repeatedly, the waterproof corrugated paper could maintain a good strength and still could be transport easily without being broken. Therefore, the waterproof corrugated paper provided by the present invention could be adapted to package products which need to be cooled or frozen, such as vegetable, fruit, fish, meat, and so on. The waterproof corrugated paper provided by the present invention could tolerate a low temperature lower than or equal to minus 40 degrees Celsius. Besides, the waterproof corrugated paper doesn't absorb water (moisture), and calcium carbonate has antibacterial effect, so that the mold or bacteria cannot grow, thereby ensuring the hygiene of the packaged food without adding an additional antibacterial and antifungal agent to avoid food safety issue. Moreover, the waterproof corrugated paper provided by the present invention could be recycled after conducting a simple sanitizing process, thereby to reach a goal of reducing waste. It is worthy to mention that comparing to the conventional corrugated paper made of the wood pulp papers, the waterproof corrugated paper provided by the present invention could significantly reduce production cost, so that the usage of the conventional corrugated carton made of the wood pulp papers could be reduced, thereby to reduce deforestation. Additionally, the waterproof corrugated paper provided by the present invention is made from natural stone powder, which could be easily decomposed in a natural environment. Therefore, a goal of environmental sustainability and environmental protection could be achieved.

Additionally, a maximum production speed of a corrugated paper made of polypropylene (PP) plastic hollow boards is only 10-15 M/min. In contrast, a production speed of the waterproof corrugated paper provided by the present invention could reach 150 M/min or even faster, and the material of the waterproof corrugated paper provided by the present invention only contains a low percentage (lower than 30 wt %) of the plastic. Therefore, the waterproof corrugated paper could be mass-produced and achieve a goal of reducing plastic (reducing 70%-80% of the plastic material used for producing the corrugated paper made of plastic hollow boards) at the same time.

The present invention provides a waterproof corrugated paper including at least one stone paper medium and at least one stone liner paper, wherein the at least one stone paper medium has a first fluting surface. The at least one stone liner paper is attached to a plurality of wave crests of the first fluting surface by using a stone glue. The stone glue includes a linear polyolefin plastic material and an inorganic material, wherein the linear polyolefin plastic material accounts for 30 wt %-70 wt % of a weight of the stone glue, and the inorganic material accounts for 30 wt %-70 wt % of the weight of the stone glue.

In addition, the another primary objective of the present invention is to provide a manufacturing method of a waterproof corrugated paper including at least following steps:
  provide a stone paper medium;
  utilize a corrugated synchronized roller to make the stone paper medium wave-shaped and to have a first fluting surface;
  provide a stone glue including a linear polyolefin plastic material and an inorganic material, wherein the linear polyolefin plastic material accounts for 30 wt %-70 wt % of the weight of the stone glue, and the inorganic material accounts for 30 wt %-70 wt % of the weight of the stone glue;
  utilize a glue roll set to apply the stone glue to a plurality of wave crests of the first fluting surface of the stone paper medium; and
  attach a stone liner paper to the plurality of wave crests of the first fluting surface of the stone paper medium.

The present invention further provides a manufacturing apparatus of a waterproof corrugated paper including a stone paper medium supply unit, a corrugated synchronized roller, a glue roll set, a stone liner paper supply unit, and a pinch roller. The stone paper medium supply unit is adapted to provide a stone paper medium. The corrugated synchronized roller is connected to the stone paper medium supply unit via the stone paper medium. When the stone paper medium passes through the corrugated synchronized roller, the stone paper medium is formed in a corrugated shape to have a first fluting surface. The glue roll set is adapted to provide a stone glue and is adjacent to the corrugated synchronized roller to apply the stone glue to a plurality of wave crests of the first fluting surface of the stone paper medium. The stone liner paper supply unit is adapted to provide a stone liner paper. The pinch roller is connected to the stone liner paper supply unit via the stone liner paper. The pinch roller is adjacent to the corrugated synchronized roller, so that both of the stone paper medium in corrugated shaped and the stone liner paper pass between the corrugated synchronized roller and the pinch roller at the same time, thereby to make the plurality of wave crests of the first fluting surface of the stone paper medium applied with the stone glue be adhered to the stone liner paper.

The present invention further provides a usage of the waterproof corrugated paper for packaging all kinds of frozen seafood and meat or for packaging the vegetables and fruits which are cooled down by spraying 5-13 degrees Celsius water The main ingredient of the waterproof corrugated paper includes the inorganic powder made by grinding natural stone and a little of the linear polyolefin plastic material for binding. Therefore, the waterproof corrugated paper could completely avoid using wood pulp. Besides, comparing to the conventional corrugated paper made of the wood pulp papers, the waterproof corrugated paper provided by the present invention has significant waterproof and frost resistant ability. Even though the waterproof corrugated paper is frozen and unfrozen repeatedly, the waterproof corrugated paper could maintain a good strength and still could be easily transported without being broken, thereby avoiding changing the package during transportation or shipping. Therefore, the waterproof corrugated paper provided by the present invention could be applied to package products which need to be cooled or frozen, such as vegetables, fruits, fish, meat, and so on.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
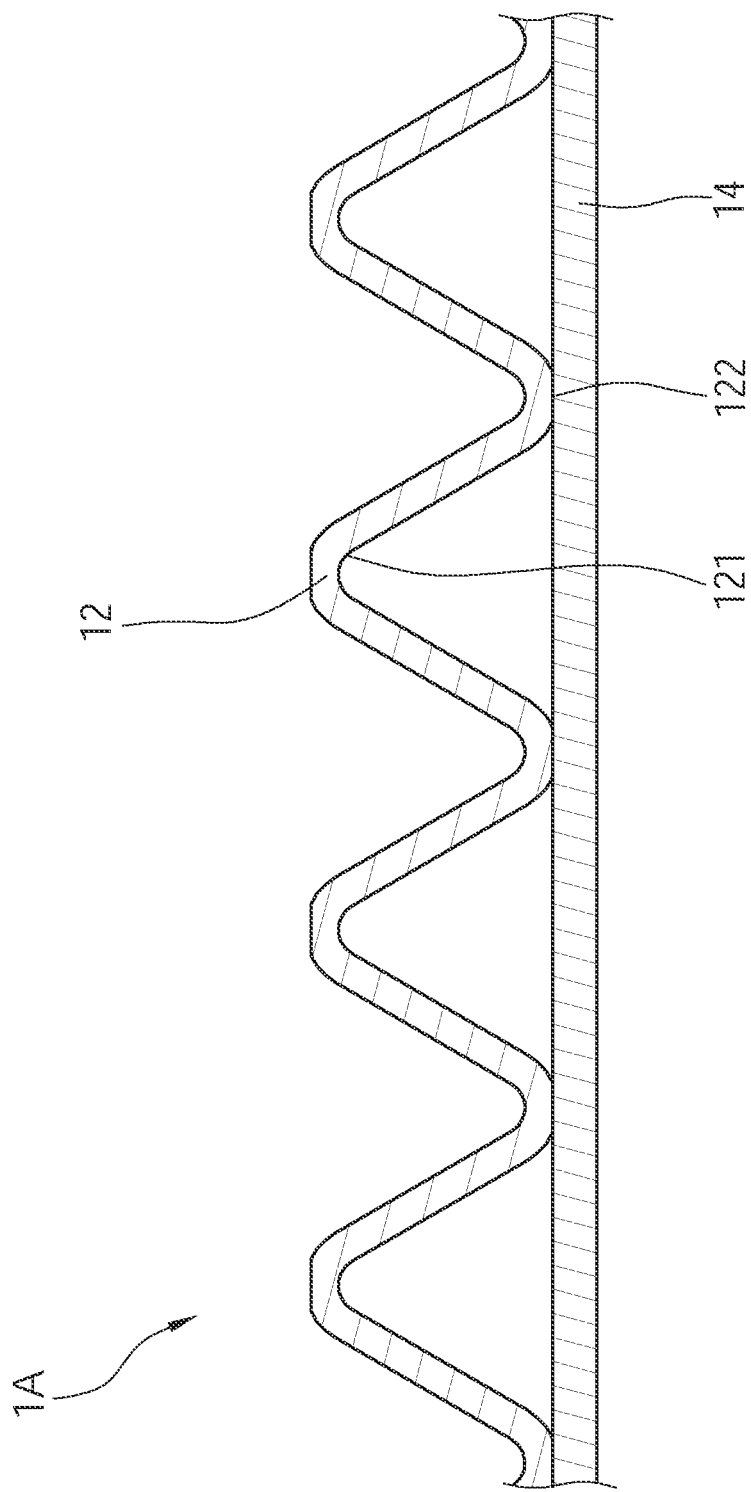
FIG. 1 is a schematic diagram of the waterproof corrugated paper of a first embodiment according to the present invention.

Referring to FIG. 1 which is a schematic diagram of a waterproof corrugated paper 1A of a first embodiment according to the present invention, the waterproof corrugated paper 1A includes a stone paper medium 12 and a stone liner paper 14, wherein the stone paper medium 12 has a first fluting surface 121, and the stone liner paper 14 is attached to a plurality of wave crests 122 of the first fluting surface 121 by using a stone glue (not shown).

The stone glue includes a linear polyolefin plastic material and an inorganic material, wherein the linear polyolefin plastic material is 30 wt %-70 wt % based on the stone glue, and the inorganic material is 30 wt %-70 wt % based on the stone glue. In the first embodiment, the linear polyolefin plastic material is preferably 30 wt %-50 wt % based on the stone glue, and the inorganic material is preferably 50 wt %-70 wt % based on the stone glue. In the current embodiment, a sum of weight percentages of the linear polyolefin plastic material and the inorganic material is equal to 100 wt % of the stone glue.

In the first embodiment, the linear polyolefin plastic material includes a polyolefin composition which includes a crystalline material, wherein the crystalline material includes polypropylene (PP), metallized polypropylene (MPP), polyethylene (PE), high density polyethylene (HDPE), metallocene linear low density polyethylene (MLLDPE), or a combination thereof. In the first embodiment, the inorganic material could be white or other inorganic materials without heavy metal, wherein the inorganic material is an inorganic powder made by grinding a natural stone, and a main ingredient of the inorganic material is calcium carbonate ($CaCO_3$) at micron-level. The inorganic material is the inorganic powder with a grain size of 2-10 micrometers (μm).

In the first embodiment, the stone paper medium 12 and the stone liner paper 14 are respectively one material layer, wherein the plurality of material layers includes the inorganic material, the linear polyolefin plastic material, and an additive, which are mixed and pressurized together. In the current embodiment, the inorganic material accounts for 60 wt %-85 wt % of a weight of each of the material layers; the linear polyolefiln plastic material accounts for 15 wt %-40 wt % of the weight of each of the material layers; the additive could be additionally added on the required demand. When the additive is needed, the additive accounts for smaller than 2 wt % of the weight of each of the material layers. In the current embodiment, a sum of weight percentages of the inorganic material, the linear polyolefin plastic material, and the additive is equal to 100 wt % of each of the material layers. In the current embodiment, the inorganic material could be, but not limited to, calcium carbonate ($CaCO_3$); the linear polyolefin plastic material could be, but not limited to, high density polyethylene (HDPE), polypropylene (PP), or a combination thereof; the additive could be, but not limited to, a processing additive, a slip agent, a toughening agent, or a combination thereof, wherein the slip agent could be, but not limited to, zinc stearate, magnesium stearate, or a combination thereof.

It's worthy to mention that, in practice, the stone paper medium 12 and the stone liner paper 14 could respectively be "Disposable (Degradable) Environmental-friendly Paper with Five Layers" claimed in Taiwan invention patent No. 1535913 of TAIWAN LUNG MENG ADVANCED COMPOSITE MATERIALS CO., LTD. and "Environmental-friendly Paper manufactured by manufacturing method thereof" claimed in Taiwan invention patent No. 379272 of TAIWAN LUNG MENG ADVANCED COMPOSITE MATERIALS CO., LTD.

Figure 2:
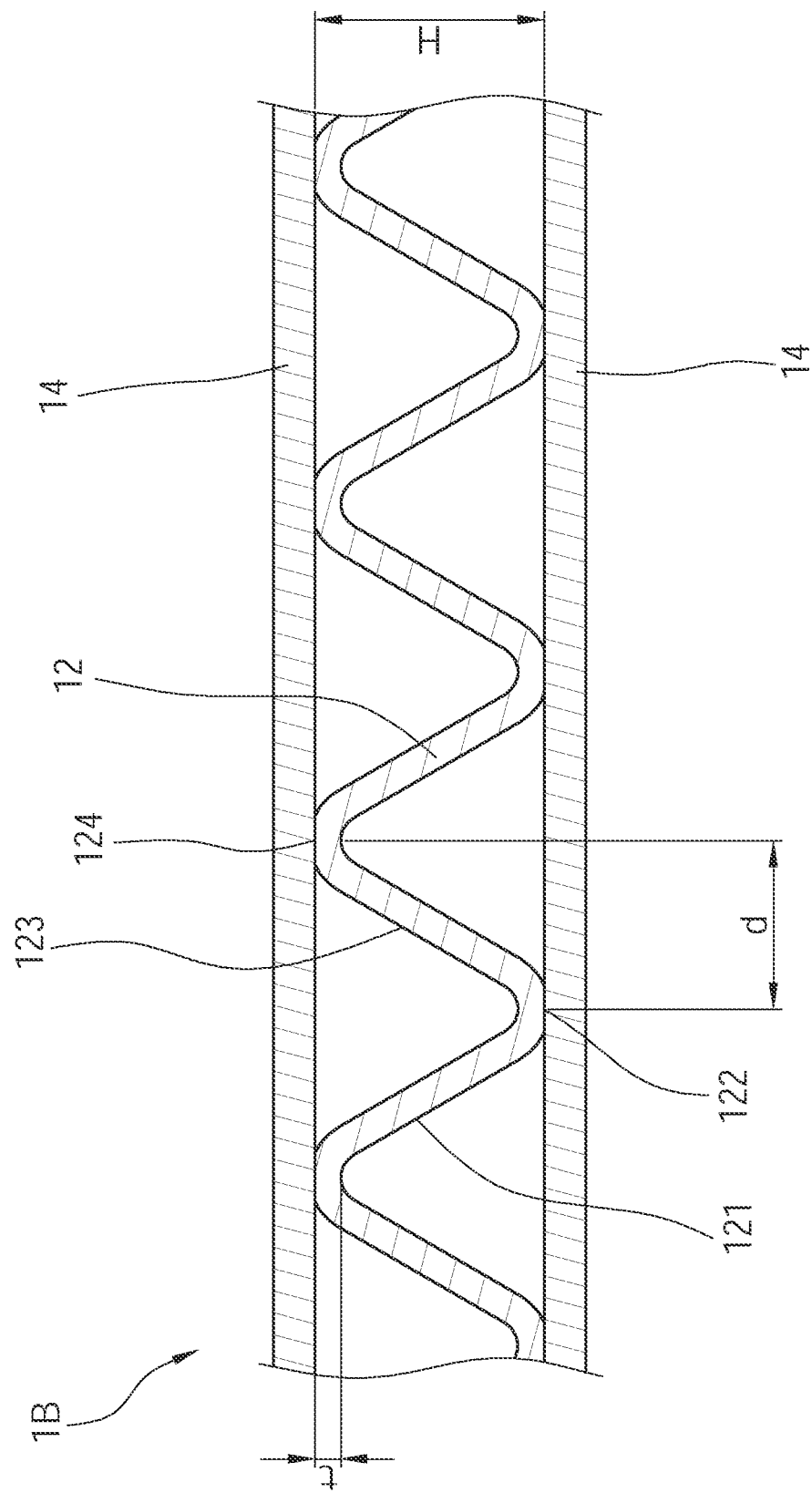
FIG. 2 is a schematic diagram of the waterproof corrugated paper of a second embodiment according to the present invention.

Referring to FIG. 2 which is a schematic diagram of a waterproof corrugated paper 1B of a second embodiment according to the present invention, the waterproof corrugated paper 1B of the second embodiment is similar to the waterproof corrugated paper 1A of the first embodiment, except that the waterproof corrugated paper 1B further includes one more layer of the stone liner paper 14. In the second embodiment, the composition of the stone paper medium 12, the stone liner papers 14, and the stone glue are the same as that of the first embodiment, thus we are not going to describe in details herein.

The waterproof corrugated paper 1B of the second embodiment includes a layer of the stone paper medium 12 and two layers of the stone liner paper 14, wherein the stone paper medium 12 has the first fluting surface 121 and a second fluting surface 123 which face opposite directions. One of the two layers of the stone liner papers 14 is attached to the wave crests 122 of the first fluting surface 121 by using the stone glue (not shown), and the other one of the layers of the stone liner papers 14 is attached to a plurality of wave crests 124 of the second fluting surface 123 by using the stone glue (not shown), thereby to form the waterproof corrugated paper 1B which is a single wall type.

In FIG. 2, the stone paper medium 12 is wave-shaped and has a thickness t and a wave height H, wherein the wave height H is defined as a vertical distance between the wave crests 122 of the first fluting surface 121 and the wave crests 124 of the second fluting surface 123. In the second embodiment, the thickness t is in a range of 0.10 mm-0.25 mm, and the wave height H is in a range of 0.6 mm-6.0 mm. Generally, the smaller the thickness t is, the weaker an average compressive strength (FCR value) of the waterproof corrugated paper 1B is; the greater the thickness t is, the stronger the average compressive strength (FCR value) of the waterproof corrugated paper 1B is. However, in the second embodiment, when the thickness t is smaller than 0.10 mm, the stone paper medium 12 is too thin that a strength of a structural support of the stone paper medium 12 is too weak, so that the average compressive strength (FCR value) of the waterproof corrugated paper 1B is too small to use. When the thickness t is larger than 0.25 mm, the average compressive strength (FCR value) of the waterproof corrugated paper 1B is great, but the stone paper medium 12 is too thick, causing a weight of the stone paper medium 12 to increase, so that a cost of material and manufacture is increased without further benefit. Generally, if the wave height H of the stone paper medium 12 is greater, the average compressive strength (FCR value) of the waterproof corrugated paper 1B is smaller; if the wave height H of the stone paper medium 12 is smaller, the average compressive strength (FCR value) of the waterproof corrugated paper 1B is greater. However, in the second embodiment, when the wave height H is larger than 6.0 mm, the wave height H of the stone paper medium 12 is too great that the strength of the structural support of the stone paper medium 12 becomes too weak, so that the average compressive strength (FCR value) of the waterproof corrugated paper 1B is too small to use. When the wave height H is smaller than 0.6 mm, the average compressive strength (FCR value) of the waterproof corrugated paper 1B is greater, but the wave height H of the stone paper medium 12 is too small that a density of the waterproof corrugated paper 1B is too great, which doesn't have practically applied value but increase the cost of material and manufacture.

It's worthy to mention that a horizontal distance d on the stone paper medium 12 is defined between one of the wave crests (i.e. the wave crests 124 of the second fluting surface 123) and one of a plurality of troughs (i.e. one of the wave crests 122 of the first fluting surface 121) which is adjacent to the one of the wave crests. The stone paper medium 12 has a flute number (Fno) which is defined by an unit distance divided by the horizontal distance d. In the second embodiment, the unit distance is 30 cm; the horizontal distance d is between 1.0 mm and 5.0 mm; the flute number (Fno) is between 60 and 300. A ratio (H/d) of the wave height H to the horizontal distanced is in a range from 0.9 to 1.8. Generally, the smaller the flute number (Fno) is, the smaller the average compressive strength (FCR value) of the waterproof corrugated paper 1B is; the greater the flute number (Fno) is, the greater the average compressive strength (FCR value) of the waterproof corrugated paper 1B is. However, in the second embodiment, when the flute number (Fno) is smaller than 60, the flute number (Fno) of the stone paper medium 12 is not enough to provide sufficient strength of the structural support, so that the average compressive strength (FCR value) of the waterproof corrugated paper 1B is too small to use. When the flute number (Fno) is larger than 120, the average compressive strength (FCR value) of the waterproof corrugated paper 1B becomes greater, but the flute number (Fno) of the stone paper medium 12 is too great that the density of the waterproof corrugated paper 1B is too great, which doesn't have practically applied value but increase the cost of material and manufacture. On the other hand, the greater the ratio (H/d) of the wave height H to the horizontal distance d is, the smaller the average compressive strength (FCR value) of the stone paper medium 12; the smaller the ratio (H/d) of the wave height H to the horizontal distance d is, the greater the average compressive strength (FCR value) of the stone paper medium 12 is. However, in the second embodiment, when the ratio (H/d) of the wave height H to the horizontal distance d is larger than 1.8, the flute number (Fno) of the stone paper medium 12 is not enough to provide sufficient strength of the structural support, so that the average compressive strength (FCR value) of the waterproof corrugated paper 1B is too small to use. When the ratio (H/d) of the wave height H to the horizontal distance d is smaller than 0.9, the average compressive strength (FCR value) of the waterproof corrugated paper 1B becomes greater, but the flute number (Fno) of the stone paper medium 12 is too great that the density of the waterproof corrugated paper 1B is too great, which doesn't have practically applied value but increase the cost of material and manufacture.

Additionally, the average compressive strength (FCR value) of the waterproof corrugated paper 1B is directly proportional to a thickness of each of the two stone liner papers 14. If the thickness of each of the two stone liner papers 14 is larger, the average compressive strength (FCR value) of the waterproof corrugated paper 1B is greater. On the contrary, if the thickness of each of the two stone liner papers 14 is smaller, the average compressive strength (FCR value) of the waterproof corrugated paper 1B is smaller.

The average compressive strength (FCR value) of the waterproof corrugated paper 1B is directly proportional to a hardness of the stone paper medium 12. In other words, the harder the stone paper medium 12 is, the greater the average compressive strength (FCR value) of the waterproof corrugated paper 1B is. On the contrary, the softer the stone paper medium 12 is, the smaller the average compressive strength (FCR value) of the waterproof corrugated paper 1B is. The hardness of the stone paper medium 12 is related to the composition of the stone paper medium 12, wherein if a proportion of the inorganic material of the stone paper medium 12 is greater, the stone paper medium 12 is softer. If the proportion of the inorganic material of the stone paper medium 12 is smaller, the stone paper medium 12 is harder. For example, a hardness of the stone paper medium 12 with 80 w/w % of the inorganic material is smaller than that of the stone paper medium 12 with 50 w/w % of the inorganic material. Besides, the hardness of the stone paper medium 12 is related to the thickness t of the stone paper medium 12. The larger the thickness t of the stone paper medium 12 is, the harder the stone paper medium 12 is; the smaller the thickness t of the stone paper medium 12 is, the softer the stone paper medium 12 is. In an embodiment, the stone paper medium 12 with desired thickness t could be produced by adjusting the proportion of the inorganic material in the stone paper medium 12, thereby to obtain an average compressive strength (FCR value) which is preferable.

Figure 3:
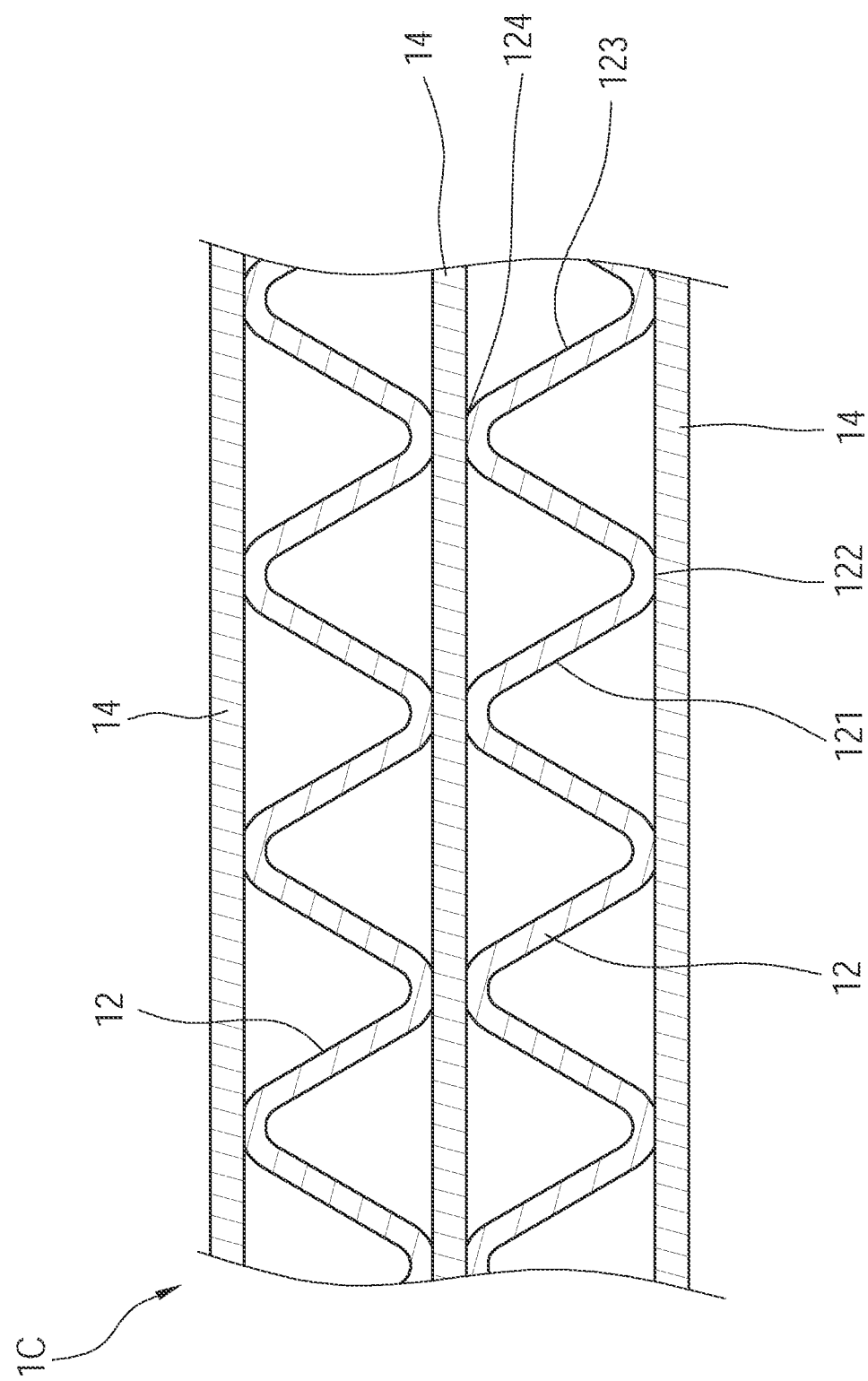
FIG. 3 is a schematic diagram of the waterproof corrugated paper of a third embodiment according to the present invention.

Referring to FIG. 3 which is a schematic diagram of a waterproof corrugated paper 1C of a third embodiment according to the present invention, the waterproof corrugated paper 1C of the third embodiment is similar to the waterproof corrugated paper 1B of the second embodiment, except that the waterproof corrugated paper 1C further includes one more layer of the stone paper medium 12 and one more layer of the stone liner paper 14. In the third embodiment, the composition of the stone paper medium 12, the stone liner papers 14, and the stone glue are the same as that of the first embodiment, thus we are not going to describe in details herein.

The waterproof corrugated paper 1C of the third embodiment includes two layers of the stone paper medium 12 and three layers of the stone liner papers 14, wherein the two stone paper mediums 12 are respectively arranged between two of the three stone liner papers 14. The plurality of wave crests 122 of the first fluting surface 121 of each of the two stone paper mediums 12 are attached to one of the three stone liner papers 14 by using the stone glue, and the plurality of wave crests 124 of the second fluting surface 123 of each of the two stone paper mediums 12 are attached to another one of the three stone liner papers 14 by using the stone glue.

Figure 4:
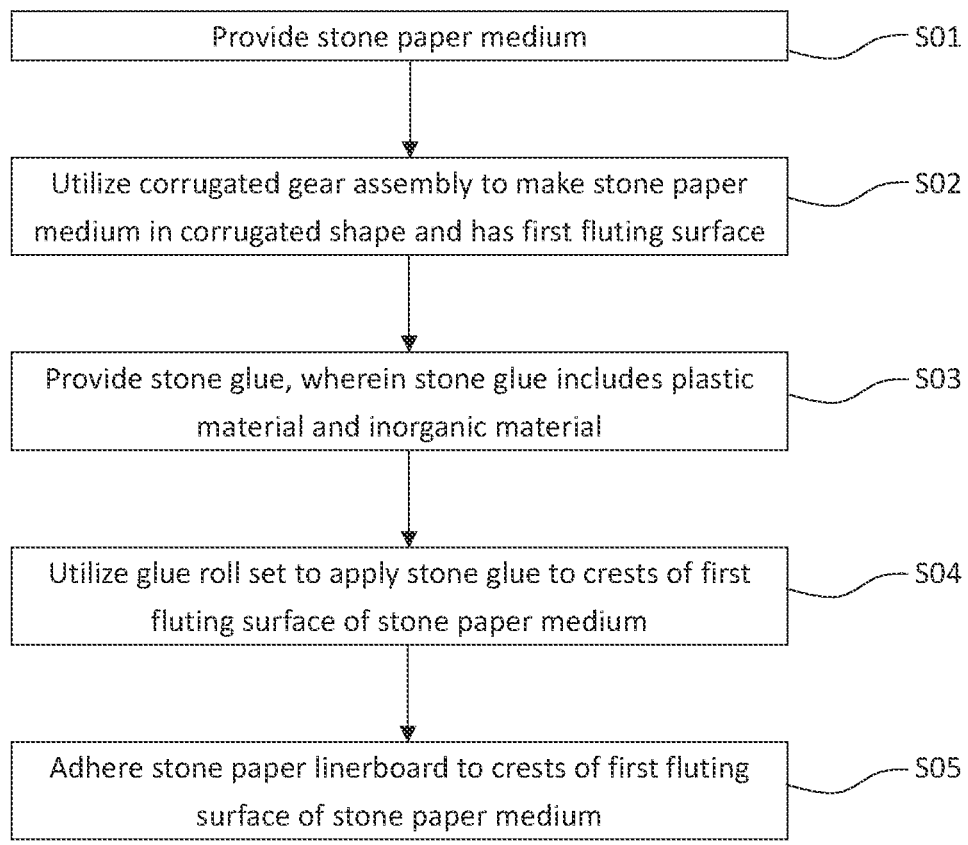
FIG. 4 is a flowchart, showing the processes of the manufacturing method of the waterproof corrugated paper of an embodiment according to the present invention.
Figure 5:
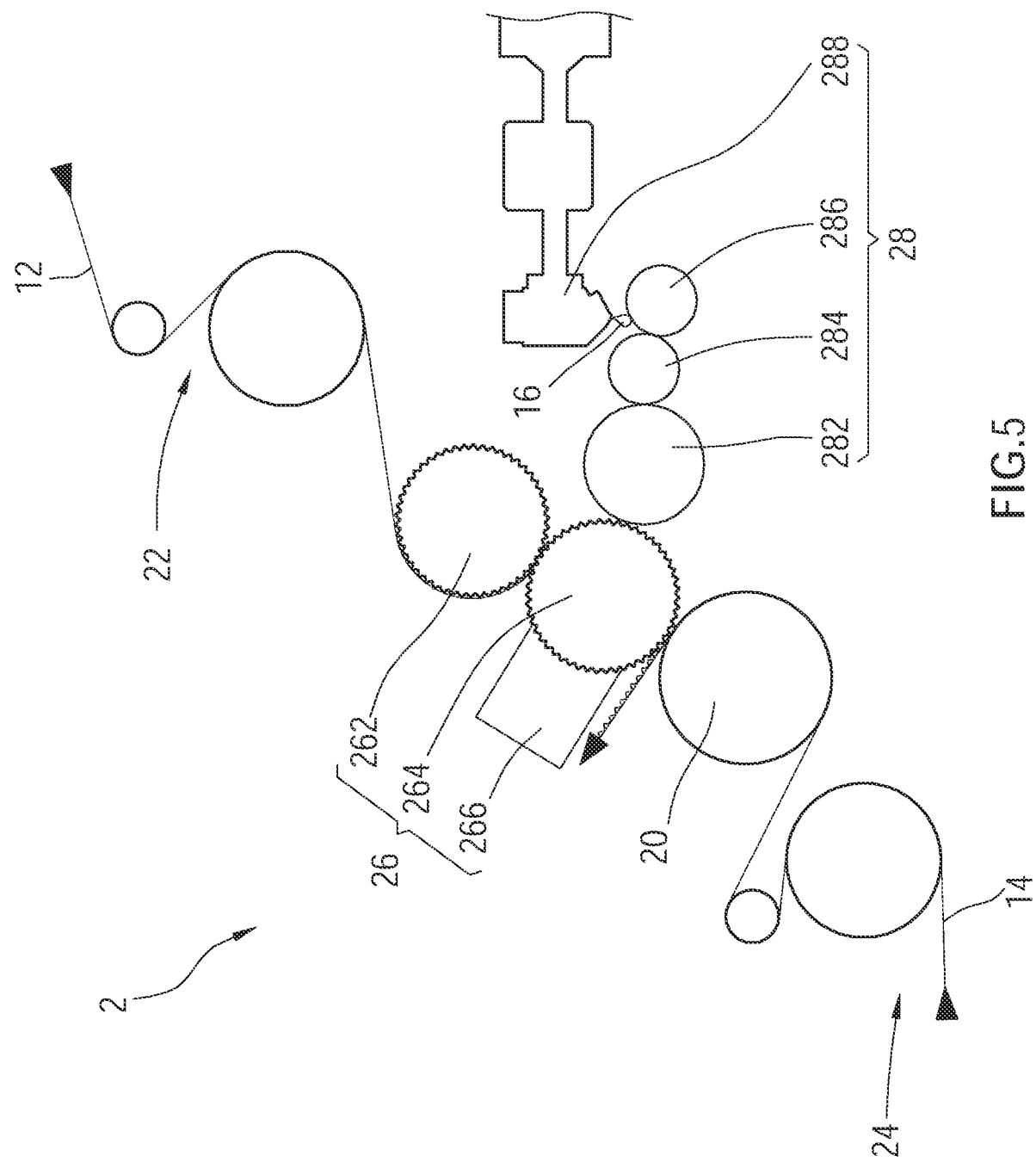
FIG. 5 is a schematic diagram of the manufacturing apparatus of the waterproof corrugated paper of an embodiment according to the present invention.
Figure 6:
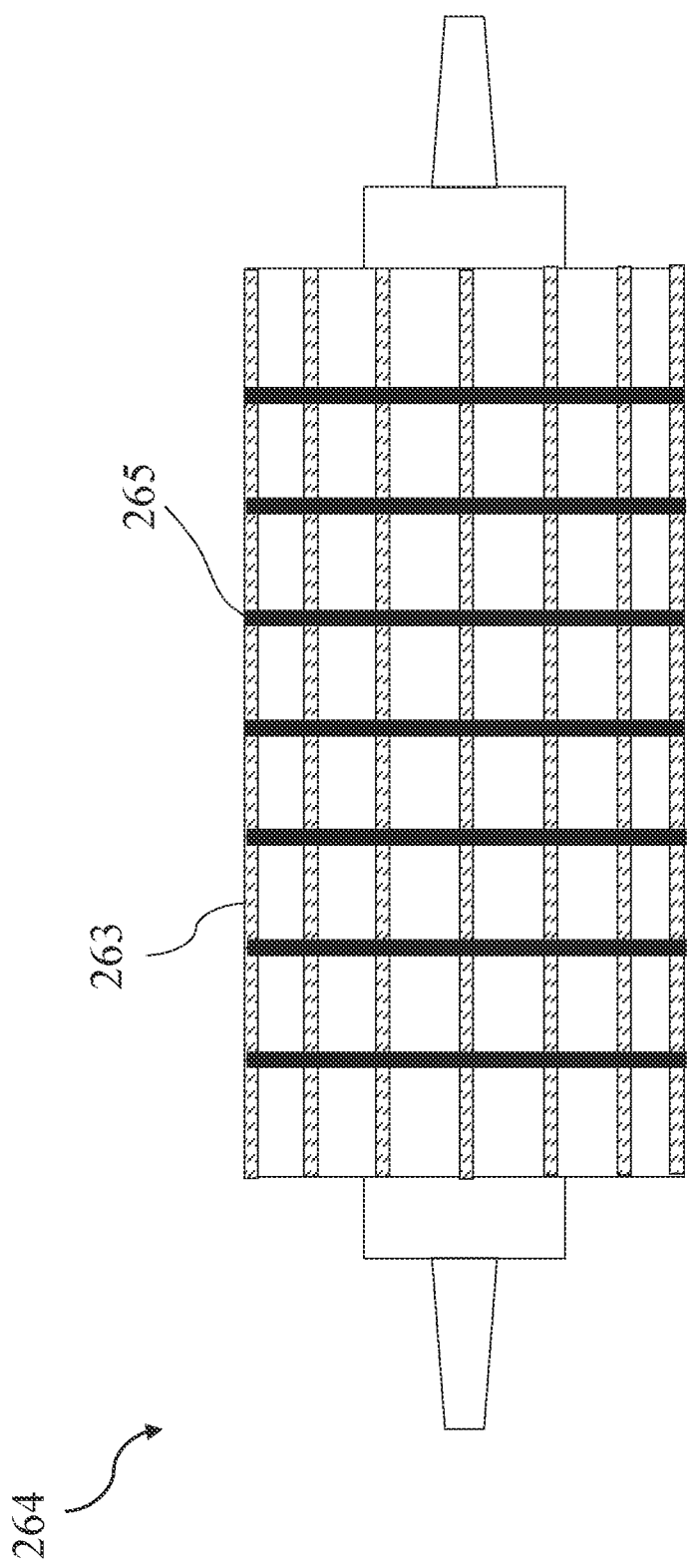
FIG. 6 is a top view of the second gear of the corrugated synchronized roller of an embodiment according to the present invention.

Referring to FIG. 1 and FIG. 4 to FIG. 6, FIG. 4 is a flowchart of a manufacturing method of a waterproof corrugated paper of an embodiment according to the present invention. FIG. 5 is a schematic diagram of a manufacturing apparatus 2 of a waterproof corrugated paper of an embodiment according to the present invention. FIG. 6 is a top view of a second gear 264 of a corrugated synchronized roller 26 of an embodiment according to the present invention. The waterproof corrugated paper mentioned in FIG. 4 and FIG. 5 is the waterproof corrugated paper 1A of the first embodiment as an example.

The manufacturing method of the waterproof corrugated paper 1A includes at least following steps:
Step S01: the stone paper medium 12 is provided;
Step S02: the corrugated synchronized roller 26 is utilized to make the stone paper medium 12 wave-shaped and to have the first fluting surface 121;
Step S03: the stone glue 16 is provided, wherein the stone glue 16 includes the linear polyolefin plastic material and the inorganic material;
Step S04: a glue roll set 28 is utilized to apply the stone glue 16 to the plurality of wave crests 122 of the first fluting surface 121 of the stone paper medium 12;
Step S05: the stone liner paper 14 is attached to the plurality of wave crests 122 of the first fluting surface 121 of the stone paper medium 12.

In the current embodiment, the stone glue 16 includes the linear polyolefin plastic material and the inorganic material, wherein the linear polyolefin plastic material is 30 wt %-70 wt % based on the stone glue, and the inorganic material is 30 wt %-70 wt % based on the stone glue. In the current embodiment, the plastic is preferably 30 wt %-50 wt % based on the stone glue, and the inorganic material is preferably 50 wt %-70 wt % based on the stone glue. In the current embodiment, a sum of weight percentages of the linear polyolefin plastic material and the inorganic material is equal to 100 wt % of the stone glue.

In FIG. 5, the manufacturing apparatus 2 of the waterproof corrugated paper includes a stone paper medium supply unit 22, the corrugated synchronized roller 26, the glue roll set 28, a stone liner paper supply unit 24, and a pinch roller 20, wherein the stone paper medium supply unit 22 is adapted to provide the stone paper medium 12. The corrugated synchronized roller 26 is connected to the stone paper medium supply unit 22 via the stone paper medium 12. When the stone paper medium 12 passes through the corrugated synchronized roller 26, the stone paper medium 12 is formed in a corrugated shape to become the stone paper medium 12 formed in corrugated shaped to have the first fluting surface 121. The glue roll set 28 is adapted to provide the stone glue 16 and is adjacent to the corrugated synchronized roller 26 to apply the stone glue 16 to the plurality of wave crests 122 of the first fluting surface 121 of the stone paper medium 12. The stone liner paper supply unit 24 is adapted to provide the stone liner paper 14. The pinch roller 20 is connected to the stone liner paper supply unit 24 via the stone liner paper 14. The pinch roller 20 is adjacent to the corrugated synchronized roller 26, so that both of the stone paper medium 12 in corrugated shape and the stone liner paper 14 pass through a gap formed between the corrugated synchronized roller 26 and the pinch roller 20 at the same time, thereby to make the plurality of wave crests 122 of the first fluting surface 121 of the stone paper medium 12 applied with the stone glue 16 be adhered to the stone liner paper 14.

In the first embodiment, the stone paper medium 12 and the stone liner paper 14 are respectively one material layer, wherein the material layers include the inorganic material, the linear polyolefin plastic material, and the additive, which are mixed and pressurized together. In the current embodiment, the inorganic material accounts for 60 wt %-85 wt % of a weight of each of the material layers; the linear polyolefin plastic material accounts for 15 wt %-40 wt % of the weight of each of the material layers; the additive could be additionally added on the required demand. When the additive is needed, the additive accounts for smaller than 2 wt % of the weight of each of the material layers. In the current embodiment, the sum of weight percentages of the inorganic material, the linear polyolefin plastic material, and the additive is equal to 100 wt % of each of the material layers. In the current embodiment, the inorganic material could be, but not limited to, calcium carbonate ($CaCO_3$); the linear polyolefin plastic material could be, but not limited to, high density polyethylene (HDPE), polypropylene (PP), or a combination thereof; the additive could be, but not limited to, a processing additive, a slip agent, a toughening agent, or a combination thereof, wherein the slip agent could be, but not limited to, zinc stearate, magnesium stearate, or a combination thereof.

It's worthy to mention that, in practice, the stone paper medium 12 and the stone liner paper 14 could respectively be "Disposable (Degradable) Environmental-friendly Paper with Five Layers" claimed in Taiwan invention patent No. 1535913 of TAIWAN LUNG MENG ADVANCED COMPOSITE MATERIALS CO., LTD. and "Environmental-friendly Paper manufactured by manufacturing method thereof" claimed in Taiwan invention patent No. 379272 of TAIWAN LUNG MENG ADVANCED COMPOSITE MATERIALS CO., LTD.

In the FIG. 5, the corrugated synchronized roller 26 includes a first gear 262 and a second gear 264 which meshes with the first gear 262. The stone paper medium 12 is provided between the first gear 262 and the second gear 264. When the stone paper medium 12 passes between the first gear 262 and the second gear 264, the stone paper medium 12 is formed in a corrugated shape. More specifically, since the first gear 262 and the second gear 264 mesh with each other, a plurality of teeth of the first gear 262 and a plurality of teeth of the second gear 264 fold the stone paper medium 12 into a corrugated shape when the stone paper medium 12 passes between the first gear 262 and the second gear 264. In the current embodiment, a minimum distance between the first gear 262 and the second gear 264 is greater than or equal to the thickness t of the stone paper medium 12.

Referring to FIG. 5 and FIG. 6, the corrugated synchronized roller 26 includes a negative pressure device 266, and the second gear 264 includes a plurality of negative pressure grooves 265 which are recessed from a surface of the second gear 264. The negative pressure device 266 communicates with the plurality of negative pressure grooves 265 of the second gear 264 to suck the stone paper medium 12 in corrugated shape on the second gear 264.

In FIG. 5, the glue roll set 28 includes a plurality of rollers and a stone glue supply unit 288, wherein the rollers are adjoined to each other, wherein one of the rollers is adjacent to the second gear 264 of the corrugated synchronized roller 26 and contacts with at least one crest 122 of the stone paper medium 12 in a corrugated shape. In the current embodiment, the plurality rollers include a first roller 282, a second roller 284, and a third roller 286. The stone glue supply unit 288 is located above the second roller 284 and the third roller 286 and is adapted to provide the stone glue 16 between the second roller 284 and the third roller 286. The first roller 282 is adjacent to the second gear 264 of the corrugated synchronized roller 26 and contacts with at least one crest 122 of the stone paper medium 12 in a corrugated shape. In the current embodiment, two of the three rollers (i.e. the first roller 282 and the second roller 284 or the second roller 284 and the third roller 286) could be manipulated to adjust a distance between the corresponding two rollers (i.e. a distance between the first roller 282 and the second roller 284 or a distance between the second roller 284 and the third roller 286), thereby to control an amount of the stone glue 16 applied to the plurality of wave crests 122 of the first fluting surface 121 of the stone paper medium 12. In the current embodiment, at least one of the three rollers (i.e. the first roller 282, the second roller 284, and the third roller 286) is adapted to heat the stone glue 16 to make the stone glue 16 has a better fluidity to be applied to the plurality of wave crests 122 of the first fluting surface 121 of the stone paper medium 12. In the current embodiment, the stone glue 16 is heated to maintain the stone glue 16 in a melted state, so that the stone glue 16 could be applied to the plurality of wave crests 122 of the first fluting surface 121 of the stone paper medium 12; after the stone glue 16 cools down, the stone glue 16 is fixed between the stone paper medium 12 and the stone liner paper 14. It's worthy to mentioned that when the stone glue 16 is heated to 130-180 degrees Celsius to be in the melted state, a temperature of the manufacturing environment of the waterproof corrugated paper 1A is kept between 130-160 degrees Celsius to avoid the stone glue 16 cooling down fast, so that the stone paper medium 12 and the stone liner paper 14 are slightly softened at this time. When the stone glue 16 in the melted state is applied to the stone paper medium 12 and the stone liner paper 14, sites of the stone paper medium 12 and the stone liner paper 14, which contact with the stone glue 16, are slightly melted, so that a part of the stone paper medium 12 and a part of the stone liner paper 14 are mixed with the stone glue 16; after the stone glue 16 cools down, the stone paper medium 12 and the stone liner paper 14 could be engaged more tightly and be hard to be disengaged by an external force.

When the first roller 282, the second roller 284, the third roller 286, the first gear 262, and the second gear 264 rotate, the stone glue 16 is transmitted through the first roller 282, the second roller 284, and the third roller 286 to the second gear 264 of the corrugated synchronized roller 26 to make the plurality of wave crests 122 of the stone paper medium 12 be applied with the stone glue 16.

The second gear 264 of the corrugated synchronized roller 26 is adjacent to the pinch roller 20, and both of the stone paper medium 12 in corrugated shape and the stone liner paper 14 pass between the corrugated synchronized roller 26 and the pinch roller 20 at the same time. In the current embodiment, the stone paper medium 12 applied with the stone glue 16 could be tightly adhered to the stone liner paper 14 by the pinch roller 20. In the current embodiment, a minimum distance between the pinch roller 20 and the second gear 264 is smaller than or equal to a total thickness of the waterproof corrugated paper which is a sum of the wave height H of the stone paper medium 12 and a thickness of the stone liner paper 14. In the current embodiment, the total thickness of the waterproof corrugated paper is between 0.6 mm and 6.0 mm.

In the current embodiment, the waterproof corrugated paper 1A of the first embodiment, the waterproof corrugated paper 1B of the second embodiment, and the waterproof corrugated paper 1C of the third embodiment are adapted to package seafood, vegetables, and fruits, but not limited thereto. The waterproof corrugated papers 1A, 1B, 1C provided by the embodiments according to the present invention could be applied to package any kind of stuff. The waterproof corrugated papers 1A, 1B, 1C provided by the embodiments could be used to package the frozen seafood and meat or to package the vegetables and fruits which are cooled down by spraying 5-13 degrees Celsius water. For example, the waterproof corrugated papers 1A, 1B, 1C could be further processed to produce waterproof corrugated paper boxes, waterproof corrugated paper bags, or waterproof corrugated paper rings to be used as a packaging material.

With the aforementioned design, the main ingredient of the waterproof corrugated paper includes the inorganic powder made by grinding natural stone and a little of linear polyolefin plastic material for binding, so that it could completely avoid using wood pulp. Besides, comparing to the conventional corrugated paper made of the wood pulp paper, the waterproof corrugated paper provided by the present invention has significantly waterproof and frost resistant ability. Even if the waterproof corrugated paper is frozen and unfrozen repeatedly, the waterproof corrugated paper could maintain a good strength and still could be easily transported without being broken. Therefore, the waterproof corrugated paper provided by the present invention could be applied to package the products which need to be cooled or be frozen, such as vegetables, fruits, fish, meat, and so on. The waterproof corrugated paper provided by the present invention could tolerate a low temperature lower than or equal to minus 40 degrees Celsius. Additionally, the waterproof corrugated paper doesn't absorb water (moisture), and the characteristic of the Calcium Carbonate ($CaCO_3$) could avoid the growth of mold or bacteria, so that the waterproof corrugated paper ensures the hygiene of the packaged food without adding an additional antibacterial and antifungal agent. Furthermore, since the additional antibacterial and antifungal agent doesn't need to be added, there is no food safety issue. When the package contains the containers having liquid (e.g. water, drinks or condiments), once the liquid leaks out, the conventional corrugated paper made of wood pulp paper absorbs the liquid easily, causing the corrugated paper broken, so that the containers in the package is possibly dropped from the package; even the corrugated paper made of the wood pulp papers located under the leaky container could be broken due to absorbing liquid. At this time, the mold and bacteria could easily grow on the corrugated paper made of the wood pulp papers which absorbs water. In contrast to the conventional corrugated paper made of the wood pulp papers, the waterproof corrugated paper provided by the present invention would not be broken due to absorbing water, so that the packaged containers would not drop, thereby to protect the completeness of other container having liquid and to keep the waterproof corrugated paper boxes being stacked in a good state. Besides, the waterproof corrugated paper provided by the present invention doesn't absorb water, so that the mold or bacteria couldn't grow on the waterproof corrugated paper.

Moreover, the waterproof corrugated paper provided by the present invention could be recycled after undergoing a simple sanitizing process, thereby to reach a goal of reducing waste. It is worthy to mention that comparing to the conventional corrugated paper made of the wood pulp papers, the waterproof corrugated paper provided by the present invention could significantly reduce the production cost, so that the usage of the conventional corrugated box made of the wood pulp papers could be reduced, thereby to reduce deforestation. Additionally, the waterproof corrugated paper provided by the present invention is made from natural stone powder, which is easily be decomposed in the natural environment. Therefore, a goal of environmental sustainability and environmental protection could be achieved.

It must be pointed out that the embodiment described above is only a preferred embodiment of the present invention. All equivalent structures and methods which employ the concepts disclosed in this specification and the appended claims should fall within the scope of the present invention.

What is claimed is:

1. A manufacturing method of a waterproof corrugated paper comprises:
   providing a stone paper medium;
   utilizing a corrugated synchronized roller to make the stone paper medium wave-shaped and to have a first fluting surface;
   providing a stone glue, wherein the stone glue comprises a linear polyolefin plastic material and an inorganic material, and the linear polyolefin plastic material accounts for 30 wt %-70 wt % of a weight of the stone glue; the inorganic material accounts for 30 wt %-70 wt % of the weight of the stone glue;
   utilizing a glue roll set to apply the stone glue to a plurality of wave crests of the first fluting surface of the stone paper medium; and
   attaching a stone liner paper to the plurality of wave crests of the first fluting surface of the stone paper medium to form the waterproof corrugated paper, wherein a production speed of the waterproof corrugated paper is over 150 m/min;

wherein the stone paper medium in a corrugated shape has a thickness and a wave height; the thickness is in a range of 0.10 mm-0.25 mm, the wave height is in a range of 0.6 mm-6.0 mm;

wherein the glue roll set comprises a plurality of rollers and a stone glue supply unit, and the stone glue supply unit is adapted to provide the stone glue from a site above the plurality of rollers; and wherein at least one of the plurality of rollers is heated;

wherein the plurality of rollers comprises a first roller, a second roller, and a third roller, a circumference of each of the plurality of rollers is flat; the first roller is adapted to apply the stone glue to the plurality of wave crests of the first fluting surface of the stone paper medium; the second roller is located between the first roller and the third roller; the stone paper medium passes on a side of the first roller which is opposite to the second roller; the stone paper medium is provided by a stone paper medium supply unit, and the stone paper medium supply unit is located above the glue roll set.

2. The manufacturing method as claimed in claim 1, wherein the corrugated synchronized roller comprises a first gear and a second gear which meshes with the first gear; the stone paper medium is provided between the first gear and the second gear; when the stone paper medium passes between the first gear and the second gear, the stone paper medium is formed in a corrugated shape.

3. The manufacturing method as claimed in claim 2, wherein the corrugated synchronized roller comprises a negative pressure device, and the second gear comprises a plurality of negative pressure grooves which are recessed from a surface of the second gear; the negative pressure device communicates with the plurality of negative pressure grooves of the second gear to suck the stone paper medium in corrugated shaped on the second gear.

4. The manufacturing method as claimed in claim 2, wherein the plurality of rollers are adjoined to each other, and the stone glue supply unit is adapted to provide the stone glue between two of the plurality of rollers; one of the plurality of rollers is adjacent to the second gear of the corrugated synchronized roller and contacts with at least one of the plurality of wave crests of the stone paper medium in corrugated shaped; when the plurality of rollers and the corrugated synchronized roller rotate, the stone glue is transmitted through the plurality of rollers to the second gear of the corrugated synchronized roller to apply the stone glue to the plurality of wave crests of the stone paper medium.

5. The manufacturing method as claimed in claim 2, wherein the second gear of the corrugated synchronized roller is adjacent to a pinch roller, so that both of the stone paper medium in corrugated shaped and the stone liner paper pass between the corrugated synchronized roller and the pinch roller at the same time, thereby to tightly adhere the stone paper medium applied with the stone glue to the stone liner paper by the pinch roller.

6. The manufacturing method as claimed in claim 1, wherein the linear polyolefin plastic material comprises a polyolefin composition, and the polyolefin composition comprises a crystalline material; the crystalline material is selected from a group consisting of polypropylene (PP), metallized polypropylene (MPP), polyethylene (PE), high density polyethylene (HDPE), metallocene linear low density polyethylene (MLLDPE), and a combination thereof.

7. The manufacturing method as claimed in claim 1, wherein the inorganic material is an inorganic powder with a grain size of 2-10 micrometers (μm).

* * * * *